US011147265B2

(12) United States Patent
Jarboe (10) Patent No.: US 11,147,265 B2
(45) Date of Patent: Oct. 19, 2021

(54) WILDLIFE DECOY WITH FLAPPER APPARATUS

(71) Applicant: Nathan Jarboe, Georgetown, KY (US)

(72) Inventor: Nathan Jarboe, Georgetown, KY (US)

( * ) Notice: Subject to any disclaimer, the term of this patent is extended or adjusted under 35 U.S.C. 154(b) by 320 days.

(21) Appl. No.: 16/540,373

(22) Filed: Aug. 14, 2019

(65) Prior Publication Data

US 2020/0077640 A1 Mar. 12, 2020

Related U.S. Application Data

(60) Provisional application No. 62/727,788, filed on Sep. 6, 2018.

(51) Int. Cl.
*A01M 31/06* (2006.01)

(52) U.S. Cl.
CPC .................... *A01M 31/06* (2013.01)

(58) Field of Classification Search
CPC ....... A01M 31/06; A63H 29/22; A63H 13/00; A63H 33/26
See application file for complete search history.

(56) References Cited

U.S. PATENT DOCUMENTS

| 9,266,591 B2 * | 2/2016 | Lu ........................... B63H 1/36 |
| 2015/0230452 A1 * | 8/2015 | Thomas ................. A01M 31/06 43/3 |

FOREIGN PATENT DOCUMENTS

CN 103342163 A * 10/2013

OTHER PUBLICATIONS

Higdon Outdoors LLC: XS Splashing-Flasher, Mallard Drake 12V (with timer): http://www.higdondecoys.com/product-p/53077.htm accessed on Nov. 7, 2019.
Higdon Outdoors:XS Crazy Kicker, Mallard Drake 12V (with timer) Accessed on Nov. 7, 2019.http://www.higdondecoys.com/product-p/53012.htm.
Lucky Duck Premium Decoys: Flappers: Accessed on Nov. 7, 2019 https://www.luckyduck.com/flappers/.
MOJO Outdoors: Elite Series—King Mallard Spinning Wing Motion Duck Decoy: https://www.mojooutdoors.com/spinning-wing-decoys/mojo-king-mallard accessed on Nov. 7, 2019.
MOJO Outdoors: MOJO® Flock a Flickers® (6 pack): https://www.mojooutdoors.com/spinning-wing-decoys/mojo-flockaflickers accessed on Nov. 7, 2019.

* cited by examiner

*Primary Examiner* — Monica L Barlow
*Assistant Examiner* — Brittany A Lowery
(74) *Attorney, Agent, or Firm* — Luedeka Neely Group, P.C.

(57) ABSTRACT

A mechanism for producing simulated tail motion or other motion in a waterfowl decoy. It may include a cantilevered carbon fiber composite spring clamped rigidly at one end and free at the other. At the free distal end of the spring, a permanent magnet and simulated tail are affixed. Fixed rigidly nearby, within the decoy body, near the magnet but not in direct contact with the magnet, is an inductor/coil. The coil is energized and de-energized at a frequency matching the resonant frequency of the spring/magnet/tail assembly, which causes the tail/magnet assembly to oscillate back and forth from side to side as the magnetic field within the coil varies, providing variable attraction between coil and magnet. Custom circuitry, which is energized by a battery, provides appropriately timed electrical impulses to the coil.

19 Claims, 7 Drawing Sheets

WILDLIFE DECOY WITH FLAPPER APPARATUS

CROSS REFERENCE TO RELATED APPLICATIONS

This application claims priority to U.S. provisional patent application Ser. No. 62,727,788 filed on Sep. 6, 2018, which is hereby incorporated herein by reference in its entirety.

FIELD

The present invention relates generally to waterfowl decoys used for hunting and, more particularly, to waterfowl decoys that mimic real movements on the water. The technology may also be used to produce movement of other decoy appendages or features.

BRIEF DESCRIPTION OF PRIOR ART

Modern waterfowl hunting success requires luring waterfowl within relatively close range in order to harvest them with legal weapons such as shotguns. One common method to achieve this is to attempt to fool waterfowl into landing within close range by placing artificial birds—decoys—in the water or on land where the hunter desires the game to congregate in order to harvest them.

One of the major problems experienced by water fowl hunters is the lack of motion from traditional style static waterfowl hunting decoys. Game seems to learn that motionless decoys are lifeless ones, and they learn to avoid them. This problem has been overcome partly by development of decoys with motorized wings which spin upon an axis via a traditional brushed electric motor. However, many waterfowl have learned to identify spinning wing decoys and have learned not to venture near them, especially while the wings are spinning, seemingly because "spinners" are not realistic when viewed at close range. Also, compared to traditional static decoys, these spinning wing decoys tend to be heavy, expensive, and require remote controls in order to turn on and off their motion at appropriate times to successfully lure waterfowl.

U.S. Pat. No. 9,265,246 by Thomas et al. defines a motion system which produces tail motion in waterfowl decoys. However, the method used to produce this motion is markedly different than that described herein. Thomas et al. describe a traditional brushed electric motor with a complex linkage containing a bearing or bearings, and multiple moving parts. Electric motors and multiple moving parts have disadvantages including poor battery life, noisy operation, and poor performance as the batteries discharge and become unable to move the more bulky linkages.

SUMMARY OF INVENTION

The motion produced by an embodiment of the invention described within this application produces motion via a wholly non-contact method utilizing electromagnetic induction of a coil and its attraction to a permanent magnet, and leverages the resonant frequency of the spring/mass/magnet combination to produce lifelike motion. The advantage of this method over traditional electric motors is simplicity, quiet operation, and tremendously improved battery life. As used herein, the resonant frequency means the frequency at which the spring/mass/magnet will swing or vibrate when repetitively powered or pushed by a force, such as a magnetic force, so as to reinforce the swinging motion.

There is a continuing need to provide for a waterfowl decoy movement system and method that better mimics real waterfowl behavior on the water. Unofficial studies conducted via polls conducted on social media outlets such as Facebook suggest hunters also desire decoys which are less expensive, more portable, more lifelike, more durable, and which have extended battery life over other commercially available options. The invention described here offers all these features.

A waterfowl decoy with a side-to-side tail motion is accomplished via an apparatus that may include a magnet, coil, and solid-state electronic circuitry powered by a battery. Motion is achieved without traditional sliding or rolling moving parts such as bearings, shafts, gears, or electric motors of any kind. Elimination of sliding and rolling parts and linkages enhances system reliability and efficiency, and reduces noise.

In one embodiment, an electromagnetic coil, positioned inside the decoy, is pulsed on and off at appropriate times to attract the movable magnet in such a way to cause the tail, or other appendage, to move in a pendulum-like motion. The motion is accomplished solely by flexure of a cantilevered composite spring clamped at one end and free at the other end. The spring may be made of pultruded carbon fiber composite for fatigue resistance and elasticity. Other materials may be used, but as the time of this writing pultruded carbon fiber has shown the best performance during testing.

Though also not a specific requirement of this product, the magnet is shaped as a round disk and is of the neodymium variety, as per the state of the art at the time of this writing. Other magnets may be used as they become available. The coil is also of similar size and disk-shaped. The parts making up the flapper assembly are designed in such a manner that when the assembly is at rest, before battery voltage is applied, the magnet is held in a position slightly to one side relative to the coil to assist with system self-starting by the following series of events:

When the circuitry is first energized, the magnet is attracted to the coil toward the coil center. While the coil causes the magnet to be attracted, the coil is simultaneously affected by presence of the magnet. As the magnet moves closer to the center of the coil, a reverse voltage is induced in the coil, causing voltage levels within the circuitry to be affected such that current to the coil is temporarily interrupted. This allows the magnet to "coast" and move back and forth across the coil. The cycle is repeated, at the resonant frequency of the spring/magnet/tail assembly, until maximum side-to-side displacement amplitude is achieved. This concept may be likened to pushing a child on a swing—ever-increasing amplitude is achieved in each case by a strategically timed push or pull or both during each cycle.

Maximum motion amplitude is achieved by numerous variables. Among these variables are optimum spring rate, spring length, magnet strength, coil parameters, coil current, optimum lateral and vertical separation distance between coil and magnet, and circuit board component properties and settings. These variables may be adjusted to vary the frequency and amplitude of vibration (swinging) and power consumption, as desired.

In accordance with one embodiment a decoy body resembling wildlife includes an elongate spring with a first end of the spring being mounted on a mounting point in the decoy and the second end of the spring being positioned to move in an arc within a plane of spring movement. A magnet is mounted on the spring proximate the second end of the spring, and an appendage is mounted on the spring proximate to a second end is configured to resemble a movable appendage of wildlife. A drive coil is mounted in the decoy body proximate to the magnet and positioned adjacent to the arc and the plane of movement of the spring, but out of the plane of movement, and a power source is mounted in the decoy to provide electrical power. A drive circuit is connected to the power source and the drive coil to provide pulses of electrical current to the coil to produce a pulsating magnetic field around the coil that drives the magnet such that the magnet bends the spring causing it to vibrate and move the appendage in a vibrating motion. Both the magnet and the coil are magnets, and the positions of the two magnets may be reversed. That is, the coil could be mounted on the spring and the magnet could be mounted in the decoy. Also, both magnets could be coils.

The decoy may further include a sensor for determining the position of the magnet and producing a sensor signal corresponding to the position of the magnet, and a control circuit for turning the power to the coil on and off in response to the sensor signal such that the pulsating magnetic field is pulsed in coordination with the vibrating motion of the spring such that the forces of the pulsating magnetic field on the magnet operate to reinforce the vibrating motion of the spring. The sensor may be a sensor circuit integrated into the driver circuit that senses a current in the coil caused by the electromagnetic induction effect of the magnet moving near the coil and produces a sensor signal in response to the current.

In a particular embodiment, the decoy may include a first transistor connected in the drive circuit to detect a first current in the coil caused by movement of the magnet near the coil. In response to the first current the first transistor turns on to create a first signal. A second transistor is connected in the drive circuit and turns on in response to the first signal, and when it is on, the second transistor connects to the power source to transmit power to the coil thereby creating a magnetic field that pulls the magnet towards the coil. The first transistor also detects an opposite current in the coil caused when the magnet passes by the coil and begins to travel away from the coil, and the first transistor responds to the opposite current to create a second signal. The second transistor responds to the second signal to turn off to stop power flowing to the coil to collapse the magnetic field of the coil and allow the magnet to move away from the coil unimpeded by a magnetic field. The operation of the first and second transistors causes the coil to produce a pulsating magnetic field that repetitively reinforces the vibrating movement of the spring.

The drive circuit may also include a snubber circuit having a Schottky diode connected in reverse bias across the coil and connected to ground to provide a path to ground for a voltage spike in the coil caused by power to the coil being turned off and the magnetic field of the coil collapsing.

The elongate spring of the decoy may have a cross sectional profile that is thick in one direction and thin in another direction such that the configuration of the elongate spring will cause it to vibrate in a single plane of spring movement that is parallel to the thin direction. The spring vibrates at a resonant frequency that is proportional to the spring stiffness.

The coil may be mounted in a position that is offset from the magnet when the spring is at rest and is not vibrating, and the drive circuit is configured to turn on in response to power being first applied from the power source to the drive circuit to produce a magnetic field that will pull the magnet from its offset position toward the center of the coil and begin the vibrating movement of the spring. A power switch may be connected between the power source and the drive circuit for switching the power to the drive circuit on and off.

In one embodiment the decoy body resembles a water fowl having a tail and a slot is formed in the tail of the decoy body. The appendage resembles a portion of a water fowl tail and is positioned in the slot formed in the tail of the decoy body, and the spring is configured to move in an arc of movement that is parallel to the slot such that the appendage moves in the slot when the spring vibrates. The appendage is configured to fit within the slot and it moves out of and into left and right sides of the slot when the spring vibrates so that the moving appendage is visible from outside the decoy.

These and other features, aspects and advantages of the present invention will become more apparent with references to the following drawings, descriptions, and claims.

BRIEF DESCRIPTION OF THE DRAWINGS

These and other features, aspects and advantages of the present invention will become more apparent with reference to the following drawings, descriptions, and claims. The drawings are briefly described below:

DESCRIPTION OF THE PREFERRED EMBODIMENT

The following description of exemplary embodiments is not to be taken as limiting but is for illustrating how the invention works in its elementary form. The scope of the invention is defined by the claims.

One main advantage of the invention is that it produces tail 109 motions with significantly less electrical power than competing products. Several competitors' decoys splash water, pump water, or spin plastic wings using traditional brushed electric motors through a pump or mechanical linkages and/or gears. The movement of air via wings which spin, or the movement of decoy appendages or movement of water requires much more power than the invention described here. Consequently, many prior decoys require much larger and more bulky batteries and motors to produce the desired motion. The side to side motion of the relatively light and flat tail 109 in the described invention creates little aerodynamic drag, and oscillates at the system resonant frequency, and is consequently more energy efficient.

Another advantage of the described invention is the lifelike, and subtle, tail 109 movement. Many previous decoys pump so much water, splash so much water, or flap their wings with such continuous vigor that waterfowl can identify and avoid such products, particularly after deafening near-death experiences within close vicinity to them. The invention described herein produces side-to-side pendulum motion of a simulated tail 109 which, when viewed from above, simulates tail motion of a real duck—an action real ducks and other waterfowl may perform hundreds of times per day.

Figure 6:
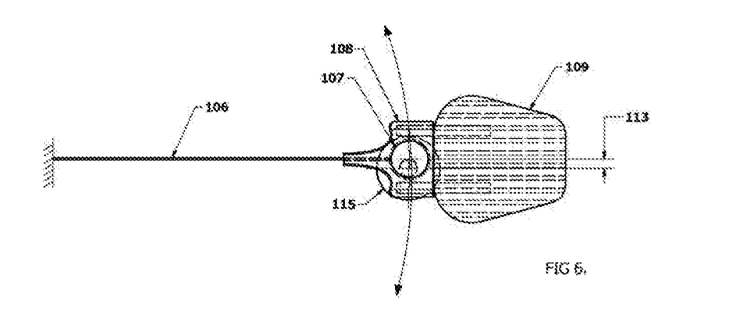
FIG. 6 is a somewhat diagrammatic top overview of the spring 106, coil holder 108, magnet 107 and tail 109 showing the side-to-side overlap, or coil offset 113, between the coil 115 and the magnet 107.
Figure 7:
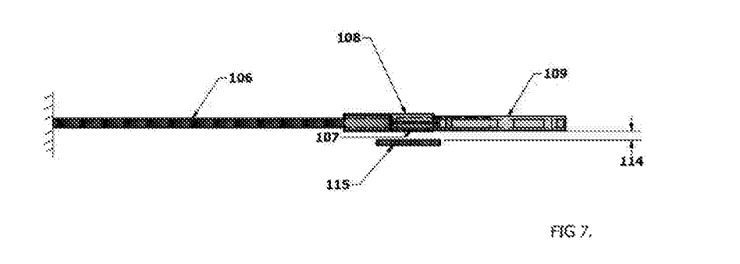
FIG. 7 is a somewhat diagrammatic side view of the spring 106, coil holder 108, magnet 107, and tail 109 showing the clearance, or coil air gap 114, between the coil 115 and the magnet 107.

The tail 109 feature of the described invention remains near the decoy centerline when the system is inactive i.e. at rest, but is slightly offset to one side. When viewed from above, the edges of the tail 109 are barely visible on the left and the right and are mostly shielded by the plastic decoy cover 104 above, and the blow molded decoy 118 below, and to the sides by both. This allows ready transport of the device to the hunting location via traditional means such as a slot bag or backpack and protects the system from damage during transport. When the system is active, the tail 109 wags from side to side in an arc, exiting an opening in each side of the decoy, so that the tail 109 becomes visible to waterfowl, especially from directly above. As best shown in FIGS. 6 and 7, the spring has a cross sectional profile (a side profile) that is thick in one direction and thin in the perpendicular direction. Thus, the spring is configured such that its profile will cause it to vibrate or oscillate in a direction perpendicular to its thick dimension and parallel to its thin dimension.

Figure 3:
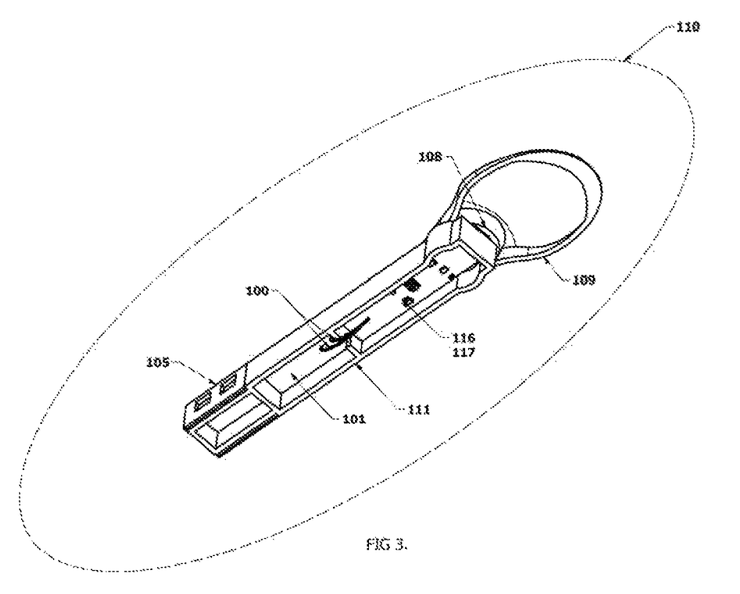
FIG. 3 is a bottom perspective view of an assembled flapper mechanism 110.
Figure 4:
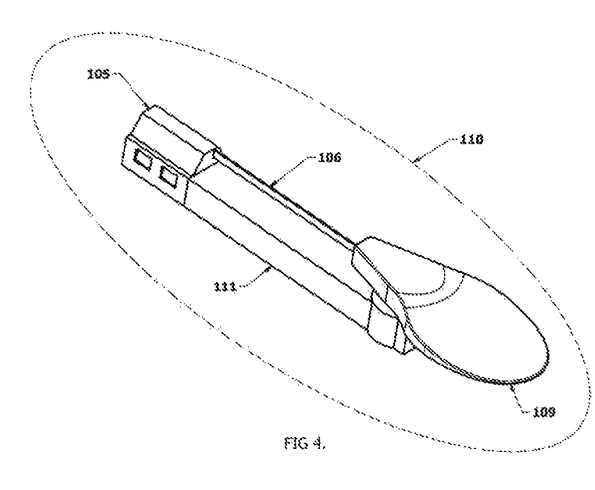
FIG. 4 is a top perspective view of the flapper mechanism 110.
Figure 5:
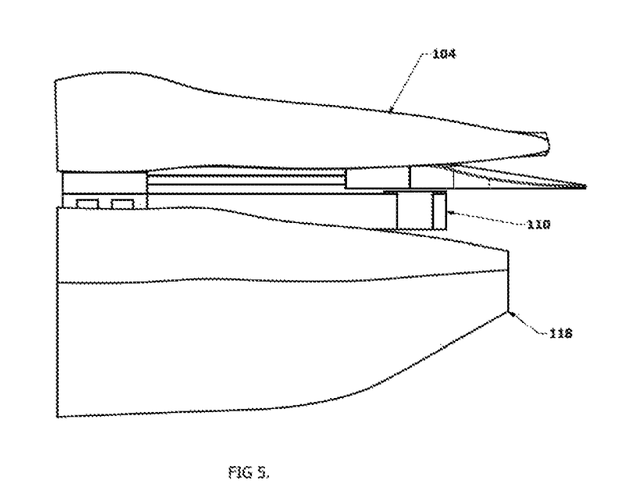
FIG. 5 shows a side view of the rear of a custom molded production decoy 118 with a flapper mechanism 110 incorporated therein.

In the embodiment described below, a decoy tail 109 moves back and forth, like a common tail wagging motion of a real duck during feeding or preening, and it creates life-like tail motion, yet it contains no traditional moving parts which slide or rotate against each other. It is by virtue of these features a wholly non-contact motion method. Motion is achieved in part by elastic flexure of an integral component, the composite cantilevered spring 106, instead of traditional motors, gears, linkages, bearings, etc Flapper Mechanism 110 Construction Referring to FIGS. 1, 3 & 4, the parts which make up a functioning unit capable of creating tail motion is hereafter referred to as a "flapper mechanism"110. FIGS. 3 & 4 show a flapper mechanism 110 from both the top and bottom, respectively. A generic flapper mechanism 110 consists of supporting parts such as the spring mount 105, spring 106, coil 115, magnet 107, tail 109, wire leads 100, and circuit board 117. A decoy cover 104 hides the flapper mechanism 110 within the decoy during operation.

Figure 8:
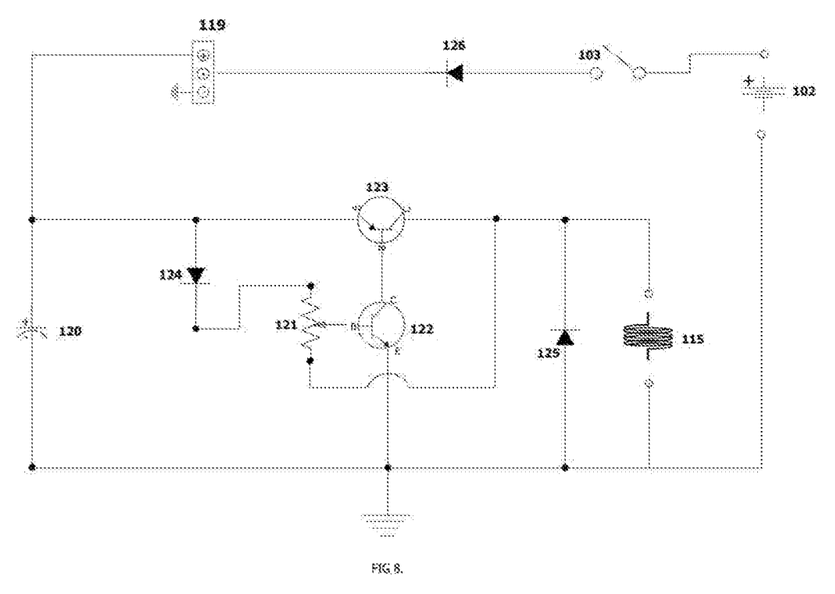
FIG. 8 is a circuit diagram of the electrical drive mechanism used to drive the coil 115 and move the magnet 107 through the desired movement arc.

A lithium ion battery 102, resides in a battery compartment 101, shown in FIG. 3, and is both rechargeable and replaceable. A separate switch 103, seen in the circuit diagram of FIG. 8 is provided and it may be a mechanical switch, or a manual electronic switch, or a remote-control electronic switch.

Figure 1:
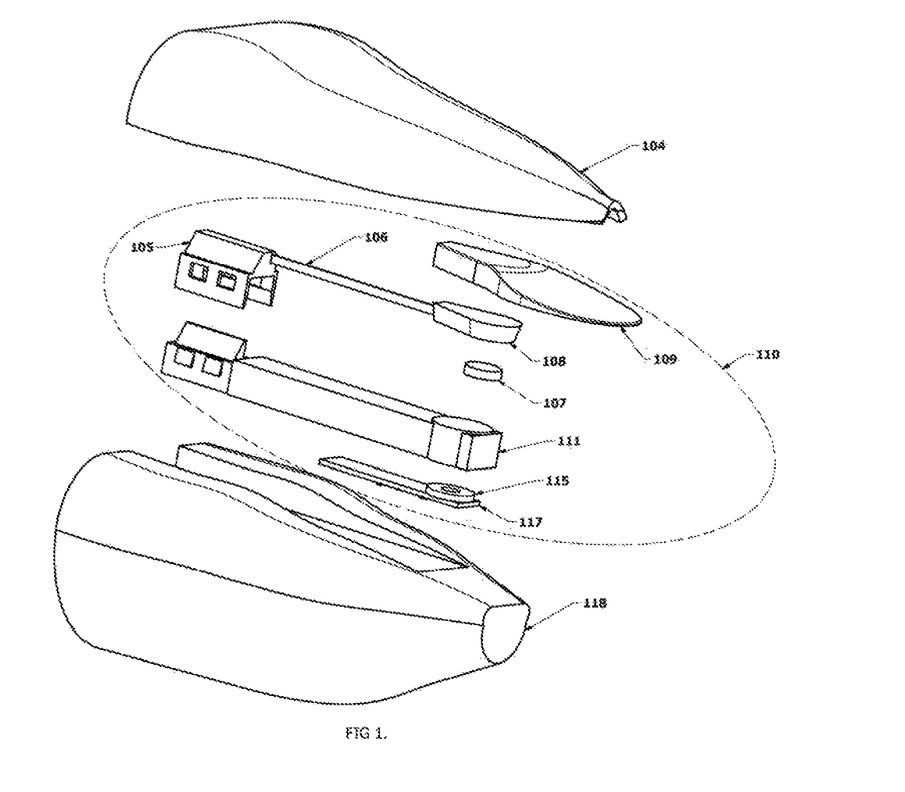
FIG. 1 is an exploded view of the flapper mechanism 110, blow molded decoy 118, and decoy cover 104, showing the detailed parts in their relative positions.
Figure 2:
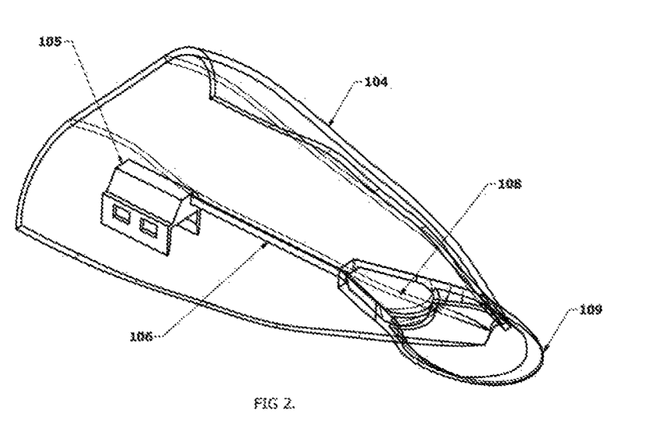
FIG. 2 is a somewhat diagrammatic view of the duck decoy back showing a cantilever spring 106 mounted in a fixed spring mount 105 and holding a (simulated waterfowl) tail 109.

Referring to FIG. 1, the flapper mechanism 110 contains a rigid frame 111 which forms the foundation for the remainder of the flapper mechanism 110, shown in FIGS. 3 and 4. The coil 115 is integral to the circuit board 117 and is placed inside the frame 111. The spring mount 105, visible in FIGS. 1 and 2, are clipped into place onto the frame 111 and held in place by matching tabs on the frame 111.

As shown in FIG. 1, the spring mount 105 and magnet holder 108 are co-molded onto the spring 106 in a single plastic injection molding operation. The distal or aft end of the spring 106 is fitted with the magnet holder 108 and magnet 107 pressed into place and held by an interference fit. The tail 109 is made of a flexible rubber-like material which is then fitted over the magnet holder 108 and held in place by virtue of the elasticity provided by the tail material.

Referring to FIG. 3, the circuit board 117 is then inserted into a circuit board cavity 116 within the frame 111. The circuit board 117 may be protected by potting.

Frequency of Oscillation

Referring to FIG. 6, frequency of tail 109 oscillation about the "movement arc" is determined by more than one variable. Among the variables are stiffness of the spring 106, length of the spring 106, weight/mass of magnet 107 and magnet holder 108, and size, shape, length, width, and weight (resulting moment of inertia) of tail 109. Frequency of tail oscillations can thus be controlled in the desired range from 1.0 Hz to 5.0 Hz by varying these factors, particularly the weight of the magnet 107 and tail 109 and length of spring 106.

Tail Motion Arc

Also considering FIG. 6, the distance that the tail 109 travels from side to side can be controlled by length of the spring 106, and strength of interaction between coil 115 and magnet 107. Distance the tail oscillates from side to side, along the "movement arc", relative to the at-rest condition is between 2 inches and 6 inches, depending upon decoy configuration desired. In a particular embodiment arc length is 100 degrees total, 50 degrees to the left and 50 degrees to the right from the center resting position.

Electrical Power Source

The current embodiment includes a single cylindrical lithium ion battery. Per FIG. 3, a wire 100 containing two conductors is routed from the circuit board 117 housed within the flapper mechanism 110 to the battery compartment 101. Alternate power sources may be used in the future, as they become available, with various holder and switch arrangements. Future designs may also include a remote-control feature. A basic flapper mechanism 110 may be used to produce movement of any waterfowl moving appendage, including, but not limited to tail, leg, wing, head, and neck.

Noting FIG. 6, one important feature of the system is the coil offset 113 between coil 115 and magnet 107, and another feature is the coil air gap 114 demonstrated in FIG. 7. Coil offset 113 affects self-start, and is designed so that system self-start is readily achieved. Without coil offset 113, no initial movement of the magnet 107 is achieved when the coil is energized, and thus no sideward motion is initiated, since the magnet 107 is always pulled toward the center of the coil 115 by the current provided by the circuit board 117. Coil air gap 114 is also necessary for operation so that the magnet 107 may pass back and forth across the coil 115 without collision of the two.

Circuit Description

Referring to FIG. 8, the circuit board contains components to energize and deenergize the coil 115 at appropriate times so that force is applied to the magnet 107 (FIGS. 2-11) for desired operation. A voltage regulator 119 is placed in the circuit between the battery 102 and the remaining functioning aspects of the circuit which are responsible for magnet (not shown in FIG. 8) movement. The regulator 119 assures steady voltage input to the circuit so that performance is maintained through a variety of battery 102 charge levels. A capacitor 120 is also included, which provides stored energy for coil impulses and also offers the voltage regulator 119 capacitance, which the regulator requires for steady and proper operation. The circuit contains a voltage divider circuit made up of two legs of a potentiometer 121 which behave as two variable resistors, each being changed by turning of the potentiometer wiper/dial. The circuit is tuned for proper function prior to final assembly through adjustment of the potentiometer 121. The potentiometer 121 may be either of manual style or may be electronic, which may be digitally controlled by electronic input. In the embodiment for moving the tail 109, the circuit is tuned to oscillate the tail at a frequency of 1 to 5 HZ, and the frequency is chosen to mimic the frequency of ducks or other wildlife. Different wildlife appendages would be oscillated at different frequencies chosen to mimic the frequency of the wildlife being imitated.

The components of the circuit directly responsible for creating magnet motion are two bipolar transistors 122 and 123 which serve as switches to turn the coil 115 on and off at appropriate times to attract the magnet. One transistor is a PNP 123 transistor and one an NPN 122 style. Transistors 122 and 123 work in tandem to produce the desired effect. The NPN 122 is used to sense the coil 115 voltage state which corresponds to or indicates the position of the magnet 107 (FIGS. 6 and 7) relative to the coil 115 (FIGS. 6 and 7). The PNP 123 provides power directly to the coil 115 when activated.

With battery 102 voltage applied to the circuit, by switch 103, adjustment of the potentiometer 121 sets the voltage level at the base of the NPN transistor 122 just at its activation threshold. The coil 115 starts acting as an antenna when power is applied, so minor electromagnetic (EM) energy disturbance like radio or tv signals activate the NPN transistor 122. Also, with a dead-still magnet 107 hovering just over the coil, the magnet 107 (FIGS. 6 and 7) needs only the slightest wind current or water ripple to make the magnet 107 move enough to cause an EM disturbance to activate the NPN transistor 122 and thus start circuit activity.

The electromagnetic induction effect of the magnet moving near the coil 115, as seen in FIGS. 5-8, adds an additional voltage at the NPN transistor 122 base which firmly turns the NPN transistor 122 on, which in turn activates the PNP transistor 123, passing current from the capacitor 120 to the coil 115 causing a pull force on the magnet 107 (FIGS. 6 and 7) from the coil 115. In other words, when the NPN transistor 122 is activated, it pulls the base of the PNP transistor 123 to ground, switching on the PNP transistor 123 to provide an impulse of current directly to the coil 115. Because of the voltage divider circuit/potentiometer 121, some of the power splits off from the coil 115 and helps keep the NPN transistor 122 on. A blocking silicon diode 124 prevents current from running backwards in the circuit away from the NPN transistor 122. When the magnet 107, as in FIG. 6, nears the coil 115 center, the induced voltage caused by the presence of the magnet 107 moving near the coil changes. It plunges from positive voltage to zero, then becomes negative. This quickly turns off the NPN transistor 122. This in turn shuts off the coil-powering PNP transistor 123, letting the magnet 107 coast freely away from the coil 115.

When transistors 122 and 123 are suddenly turned off, a natural reverse voltage spike occurs from the collapsing electromagnetic field within the coil 115. Therefore, a Schottky diode 125 is reverse biased across the coil 115 to provide a safe path for current caused by this reverse electromotive force (EMF) voltage spike. The Schottky diode 125 "snubs" this current, which protects the transistor(s) 122 and 123 from excess current. A Schottky style diode 125 is specifically chosen as the snubber for this circuit because of its reduced forward bias voltage relative to a standard signal diode 124, 126, which has been proven through testing of this particular system to reduce noise and increase motion performance versus other snubber methods and diode types.

Users could potentially install the battery 102 backward; therefore, the circuit also includes a standard low-cost silicon diode 126 for reverse voltage protection. If battery 102 is installed in the reversed position by mistake, no current may flow, thus the diode protects the circuit from damage.

The discussion above is intended to provide examples of the invention and the invention is not limited to those embodiments. The invention is capable of numerous rearrangements and substitution of parts without departing from the spirit of the invention as defined in the appended claims.

The invention claimed is:

1. A wildlife decoy comprising:
a decoy body resembling wildlife;
a mounting point in the decoy body;
an elongate spring having first and second ends, a length, and a spring stiffness, the first end of the spring being mounted on the mounting point and the second end of the spring being positioned to move in an arc within a plane of spring movement;
a magnet mounted on the spring proximate the second end of the spring;
an appendage mounted on the spring proximate the second end and being configured to resemble a movable appendage of wildlife;
a drive coil mounted in the decoy body proximate to the magnet and positioned adjacent to the arc and the plane of movement, but out of the plane of movement;
a power source mounted in the decoy to provide electrical power;
a drive circuit connected to the power source and the drive coil, to provide pulses of electrical current to the coil, to produce a pulsating magnetic field around the coil that drives the magnet such that the magnet bends the spring causing it to vibrate and move the appendage in a vibrating motion.

2. The decoy of claim 1 further comprising:
a sensor for determining the position of the magnet and producing a sensor signal corresponding to the position of the magnet, and
a control circuit for turning the power to the coil on and off in response to the sensor signal such that the pulsating magnetic field is pulsed in coordination with the vibrating motion of the spring such that the forces of the pulsating magnetic field on the magnet operate to reinforce the vibrating motion of the spring.

3. The decoy of claim 1 further comprising:
a sensor circuit integrated into the driver circuit that senses a current in the coil caused by the electromagnetic induction effect of the magnet moving near the coil and produces a sensor signal in response to the current; and
a control circuit that turns the power to the coil on and off in response to the sensor circuit such that the pulsating magnetic field is pulsed in coordination with the vibrating motion of the spring such that the forces of the pulsating magnetic field on the magnet operate to reinforce the vibrating motion of the spring.

4. The decoy of claim 1 further comprising:
a first transistor connected in the drive circuit to detect a first current in the coil caused by movement of the magnet near the coil and to turn on in response to the first current to create a first signal;

a second transistor connected in the drive circuit and connected to receive the first signal and to turn on in response to the first signal, the second transistor being connected to the battery to transmit power to the coil when the second transistor turns on thereby creating a magnetic field that pulls the magnet towards the coil;

the first transistor being connected in the drive circuit to detect an opposite current in the coil caused when the magnet passes by the coil and begins to travel away from the coil, and the first transistor responding to the opposite current to create a second signal; and the second transistor being responsive to the second signal to turn off to stop power flowing to the coil to collapse the magnetic field of the coil and allow the magnet to move away from the coil unimpeded by a magnetic field.

5. The decoy of claim 4 wherein the operation of the first and second transistors causes the coil to produce a pulsating magnetic field that repetitively reinforces the vibrating movement of the spring.

6. The decoy of claim 1 wherein the drive circuit includes a snubber circuit connected to the coil to provide a path to ground for a voltage spike in the coil caused by power to the coil being turned off and the magnetic field of the coil collapsing.

7. The decoy of claim 1 wherein the drive circuit includes a snubber circuit having a Schottky diode connected in reverse bias across the coil and connected to ground to provide a path to ground for a voltage spike in the coil caused by power to the coil being turned off and the magnetic field of the coil collapsing.

8. The decoy of claim 1 further comprising:
the elongate spring having a cross sectional profile that is thick in one direction and thin in another direction such that the configuration of the elongate spring will cause it to vibrate in a single plane of spring movement that is parallel to the thin direction.

9. The decoy of claim 1 wherein the spring vibrates at a resonant frequency of the spring that is proportional to the spring stiffness.

10. The decoy of claim 1 further comprising:
the coil being mounted in a position that is offset from the magnet when the spring is at rest and is not vibrating; and
the drive circuit being configured to turn on in response to power being first applied from the power source to the drive circuit to produce a magnetic field that will pull the magnet from its offset position toward the center of the coil and begin the vibrating movement of the spring.

11. The decoy of claim 1 further comprising a power switch connected between the power source and the drive circuit for switching the power to the drive circuit on and off.

12. The decoy of claim 1 wherein:
the decoy body resembles a water fowl having a tail and a slot is formed in the tail of the decoy body, and wherein the slot has left and right sides;
the appendage resembles a portion of a water fowl tail and is positioned in the slot formed in the tail of the decoy body;
the spring is configured to move in an arc of movement that is parallel to the slot such that the appendage moves in the slot when the spring vibrates;
and the appendage is configured to move out of and into the left and right sides when the spring vibrates so that the moving appendage is visible from outside the decoy.

13. A waterfowl decoy comprising:
a waterfowl decoy body having a sealed hollow cavity which contains additional external features for mounting of a separately assembled flapper apparatus;
a flapper mechanism mounted to the hollow molded decoy via predetermined attachment features;
a fixed constraint in the flapper mechanism;
a spring, made of non-metallic carbon fiber, graphite, or other composite, having first and second ends and being fixedly attached at the first end to the fixed constraint;
a magnet mounted on the second end of the spring;
an appendage such as a tail or wing connected to the second end of the spring;
a drive coil positioned proximate to the magnet with an airspace disposed between the drive coil and the magnet;
a drive circuit for providing an electric current to the drive coil to produce a magnetic field for moving the magnet through a movement arc while flexing the spring; and
the drive circuit including a sensing element to sense the position of the magnet relative to the coil and for turning on the drive circuit at the appropriate time to create a magnetic field with the coil to drive the magnet through the movement arc and flex the spring.

14. The decoy of claim 8
wherein the coil and the magnet have a planar shape, are parallel to one another, are separated by a clearance gap, and are mounted in first and second spaced apart parallel planes; and
wherein the spring is configured to flex through a movement arc that is parallel to the first and second spaced apart parallel planes.

15. The decoy of claim 8
wherein the center of the magnet is held in a starting position by the spring when the coil is not energized; and
wherein the starting position of the magnet is offset in a direction along the movement arc with respect to the position of the coil such that the initial energization of the coil creates a magnetic field that moves the magnet.

16. A wildlife decoy comprising:
a decoy body resembling wildlife;
a mounting point on the decoy body;
an elongate spring having first and second ends, a length, and a spring stiffness, the first end of the spring being mounted on the mounting point and the second end of the spring being positioned to move in an arc within a plane of spring movement;
a first magnet mounted on the second end of the spring;
an appendage mounted on the spring proximate to the second end and being configured to resemble a movable appendage of wildlife;
a second magnet mounted to the decoy body proximate to the first magnet and positioned adjacent to the arc and the plane of movement, but out of the plane of movement;
wherein at least one of the first magnet and the second magnet is a coil;
a power source mounted in the decoy to provide electrical power;
a drive circuit connected to the power source and the coil, to provide pulses of electrical current to the coil, to produce a pulsating magnetic field around the coil that drives the other magnet such that the other magnet bends the spring causing it to vibrate and move the appendage in a vibrating motion.

17. The decoy of claim 1 further comprising:
a sensor for determining the position of the magnet and producing a sensor signal corresponding to the position of the magnet, and
a control circuit for turning the power to the coil on and off in response to the sensor signal such that the pulsating magnetic field is pulsed in coordination with the vibrating motion of the spring such that the forces of the pulsating magnetic field on the magnet operate to reinforce the vibrating motion of the spring.

18. The decoy of claim 1 wherein the drive circuit includes a snubber circuit connected to the coil to provide a path to ground for a voltage spike in the coil caused by power to the coil being turned off and the magnetic field of the coil collapsing.

19. The decoy of claim 16 further comprising: the coil being mounted in a position that is offset from the first magnet when the spring is at rest and is not vibrating; and the drive circuit being configured to turn on in response to power being first applied from the power source to the drive circuit to produce a magnetic field that will pull the first magnet from its offset position toward the center of the coil and begin the vibrating movement of the spring.

\* \* \* \* \*